(12) United States Patent
Renno et al.

(10) Patent No.: US 8,555,041 B2
(45) Date of Patent: Oct. 8, 2013

(54) METHOD FOR PERFORMING A RETURN OPERATION IN PARALLEL WITH SETTING STATUS FLAGS BASED ON A RETURN VALUE REGISTER TEST

(75) Inventors: Erik K. Renno, Trondheim (NO); Oyvind Strom, Trondheim (NO); Morten W. Lund, Skjetnemarka (NO)

(73) Assignee: Atmel Corporation, San Jose, CA (US)

( * ) Notice: Subject to any disclaimer, the term of this patent is extended or adjusted under 35 U.S.C. 154(b) by 238 days.

(21) Appl. No.: 12/795,582

(22) Filed: Jun. 7, 2010

(65) Prior Publication Data

US 2010/0250904 A1 Sep. 30, 2010

Related U.S. Application Data

(63) Continuation of application No. 11/149,611, filed on Jun. 10, 2005, now abandoned.

(51) Int. Cl.
*G06F 9/00* (2006.01)

(52) U.S. Cl.
USPC .......................................... 712/242; 712/208

(58) Field of Classification Search
None
See application file for complete search history.

(56) References Cited

U.S. PATENT DOCUMENTS

| | | | |
|---|---|---|---|
| 4,814,976 A | 3/1989 | Hansen et al. | |
| 4,891,754 A | 1/1990 | Boreland | |
| 4,926,355 A | 5/1990 | Boreland | |
| 5,070,451 A | 12/1991 | Moore et al. | |
| 5,386,563 A | 1/1995 | Thomas | |
| 5,515,519 A | 5/1996 | Yoshioka et al. | |
| 5,640,503 A | 6/1997 | Alpert et al. | |
| 5,644,699 A | 7/1997 | Yoshida | |
| 5,680,599 A | 10/1997 | Jaggar | |
| 5,701,493 A | 12/1997 | Jaggar | |
| 5,778,208 A | 7/1998 | Eickemeyer et al. | |
| 5,884,089 A | 3/1999 | Orian et al. | |
| 5,926,642 A | 7/1999 | Favor | |
| 5,954,435 A | 9/1999 | Yoshida | |
| 5,991,902 A | 11/1999 | Yoshida | |
| 6,112,289 A | 8/2000 | Matsuo | |
| 6,151,673 A | 11/2000 | Matsuo et al. | |
| 6,178,492 B1 | 1/2001 | Matsuo | |
| 6,195,744 B1 | 2/2001 | Favor | |
| 6,336,178 B1 | 1/2002 | Favor | |
| 6,434,584 B1 * | 8/2002 | Henderson et al. ........... 708/490 |
| 2002/0103991 A1 | 8/2002 | Overkamp et al. | |
| 2003/0159018 A1 | 8/2003 | Miller et al. | |

(Continued)

FOREIGN PATENT DOCUMENTS

WO   WO-2006135549 A2   12/2006

OTHER PUBLICATIONS

Patterson, David A., et al., "Computer Organization and Design", Third Edition: The Hardware/Software Interface, Third Edition; The Morgan Kaufmann Series in Computer Architecture and Design, (Aug. 16, 2004), pp. 72, 80, 135, 140, 141, 288, 380, 382, 424.*

(Continued)

*Primary Examiner* — Keith Vicary
(74) *Attorney, Agent, or Firm* — Fish & Richardson P.C.

(57) ABSTRACT

Various embodiments include methods and related media for performing operations including a return operation. One such method includes testing a content of a return value register and setting status flags. Testing the content of the return value register and setting the status flags are performed in response to a single instruction.

16 Claims, 6 Drawing Sheets

(56) References Cited

U.S. PATENT DOCUMENTS

| | | |
|---|---|---|
| 2003/0236967 A1 | 12/2003 | Samra et al. |
| 2004/0153494 A1 | 8/2004 | Mukund et al. |
| 2006/0282821 A1 | 12/2006 | Renno et al. |

OTHER PUBLICATIONS

ARM (ARM7TDMI-S Revision 3 Technical Reference Manual); 2000, ARM DDI 0084F, pp. i, ii, 1-11, 6-17.*

Mitra et al. (Mitra) (Efficient Multiplexer Synthesis Techniques); IEEE Design & Test of Computers, Oct.-Dec. 2000, pp. 2-9.*

"Chinese Application Serial No. 200680020713.8, Office Action mailed Aug. 9, 2010" (w/ English Translation), 7 pgs.

"Chinese Application Serial No. 200680020713.8, Office Action (with English translation) mailed Jul. 31, 2009", (OA was actually issued Jul. 31, 2009), 9 pgs.

"Chinese Application Serial No. 200680020713.8, Office Action mailed Mar. 4, 2009", (Office action was issued Dec. 19, 2008), 7 pgs.

"Chinese Application Serial No. 200680020713.8, Response filed Jun. 23, 2009 to Office Action dated Dec. 19, 2009".

"Chinese Application Serial No. 200680020713.8, Response filed Oct. 27, 2009 to Office Action (with English translation) mailed Jul. 31, 2009".

Patterson, David A., et al., "Computer Organization and Design", *Third Edition: The Hardware/Software Interface*, Third Edition; The Morgan Kaufmann Series in Computer Architecture and Design, (Aug. 16, 2004), p. 72, 80, 135, 140, 141,424.

"Chinese Application Serial No. 200680020713.8, Response filed Jul. 5, 2010 to Office Action dated Mar. 1, 2010", (w/ English Translation), 32 pgs.

"International Application Serial No. PCT/US06/20427, International Preliminary Report on Patentability completed Oct. 3, 2007", 7 pgs.

"International Application Serial No. PCT/US2006/020427, Response filed Sep. 26, 2007 to Written Opinion mailed Jun. 29, 2007", 21 pgs.

"U.S. Appl. No. 11/149,611, Advisory Action mailed Jan. 7, 2008", 3 pgs.

"U.S. Appl. No. 11/149,611, Final Office Action mailed Oct. 13, 2009", 17 pgs.

"U.S. Appl. No. 11/149,611, Final Office Action mailed Oct. 16, 2007", 15 pgs.

"U.S. Appl. No. 11/149,611, Final Office Action mailed on Nov. 25, 2008", 25 pgs.

"U.S. Appl. No. 11/149,611, Interview Summary May 24, 2010", 4 pgs.

"U.S. Appl. No. 11/149,611, Non Final Office Action mailed Jun. 12, 2007", 19 pgs.

"U.S. Appl. No. 11/149,611, Non-Final Office Action mailed Mar. 3, 2008.", 15 pgs.

"U.S. Appl. No. 11/149,611, Non-Final Office Action mailed Mar. 10, 2009", 26 pgs.

"U.S. Appl. No. 11/149,611, Response filed Jan. 13, 2010 to Final Office Action mailed Oct. 13, 2009", 11 pgs.

"U.S. Appl. No. 11/149,611, Response filed Dec. 13, 2007 to Final Office Action mailed Oct. 16, 2007", 16 pgs.

"U.S. Appl. No. 11/149,611, Response filed Feb. 25, 2009 to Final Office Action mailed Nov. 25, 2009", 12 pgs.

"U.S. Appl. No. 11/149,611, Response filed Jul. 10, 2009 to Non-Final Office Action mailed Mar. 10, 2009", 14 pgs.

"U.S. Appl. No. 11/149,611, Response filed Sep. 12, 2007 to Non-Final Office Action mailed Jun. 12, 2007", 18 pgs.

"U.S. Appl. No. 11/149,611, Response filed Sep. 3, 2008 to Non-Final Office Action mailed Mar. 3, 2008", 12 pgs.

"U.S. Appl. No. 11/149,611, Non-Final Office Action mailed Feb. 5, 2010", 19 pgs.

"Chinese Application Serial No. 200680020713.8, Office Action mailed, Apr. 1, 2010", 4 pgs.

"European Application Serial No. 06771282.8, Communication mailed Jan. 28, 2008", 2 pgs.

"European Application Serial No. 06771282.8, Extended European Search Report mailed Apr. 19, 2010", 11 pgs.

"European Application Serial No. 06771282.8, Response filed Feb. 28, 2008 to Communication mailed Jan. 28, 2008", 9 pgs.

"International Application Serial No. PCT/US2006/020427, International Search Report mailed Jun. 29, 2007", 1 pg.

"International Application Serial No. PCT/US2006/020427, International Written Opinion mailed Jun. 29, 2007", 9 pgs.

"Chinese Application Serial No. 200680020713.8, Office Action mailed Nov. 11, 2010", 4 pgs.

"Chinese Application Serial No. 200680020713.8, Office Action Response Filed Oct. 13, 2010", 11.

C.V. Chen, Taiwan Pat. Appln No. 095120621, Taiwan OA dated Mar. 11, 2013, 9 pages.

* cited by examiner

| CYCLE | IF | ID | EX | MEM | WB |
|---|---|---|---|---|---|
| 1 | THE RET INST. IS BEING FETCHED. /22 | | | | |
| 2 | | THE RET HAS ENTERED ID AND THE CORRECT CONTROL SIGNALS ARE GENERATED. THE RETURN ADDRESS REGISTER IS READ FROM THE REGISTER FILE. /24 | | | |
| 3 | | | THE RETURN ADDRESS REGISTER CONTENT IS WRITTEN THROUGH THE ALU WITH NO CHANGE. /26 | | |
| 4 | | | | THE RETURN ADDRESS REGISTER CONTENT IS WRITTEN PAST THE DATA MEMORY. /28 | |
| 5 | | | | | THE RETURN ADDRESS REGISTER CONTENT IS WRITTEN TO PC. THE PIPELINE IS FLUSHED. /30 |

| CYCLE | IF | ID | EX | MEM | WB |
|---|---|---|---|---|---|
| 1 | THE RETMEM INST. IS BEING FETCHED. /32 | | | | |
| 2 | | THE RETMEM HAS ENTERED ID AND THE CORRECT CONTROL SIGNALS ARE GENERATED. /34 | | | |
| 3 | | | THE CONTROL SIGNALS TO THE DATA MEMORY ARE ROUTED PAST THE ALU. /36 | | |
| 4 | | | | THE RETURN ADDRESS IS READ FROM DATA MEMORY. /38 | |
| 5 | | | | | 40\ THE RETURN ADDRESS READ FROM MEMORY IS WRITTEN TO PC. THE PIPELINE IS FLUSHED. |

| CYCLE | IF | ID | EX | MEM | WB |
|---|---|---|---|---|---|
| 1 | THE RETURN_WITH_TEST INST. IS BEING FETCHED. /-86 | | | | |
| 2 | | THE RETURN_WITH_TEST HAS ENTERED ID AND THE CORRECT CONTROL SIGNALS ARE GENERATED. THE RETURN ADDRESS REGISTER IS READ FROM THE REGISTER FILE. /-88 | | | |
| 3 | | THE RETURN_WITH_TEST IS KEPT IN ID AN ADDITIONAL CYCLE. IN THIS CYCLE, THE RETURN VALUE REGISTER IS READ FROM THE REGISTER FILE AND CONTROL SIGNALS TO INSTRUCT THE ALU TO PERFORM THE TEST OPERATION ARE GENERATED. /-90 | THE RETURN ADDRESS REGISTER CONTENT IS WRITTEN THROUGH THE ALU WITH NO CHANGE. /-92 | | |
| 4 | | | 94-\ THE ALU SETS THE FLAGS CORRESPONDING TO THE TEST OF THE RETURN VALUE REGISTER. | THE RETURN ADDRESS REGISTER CONTENT IS WRITTEN PAST THE DATA MEMORY. /-96 | |
| 5 | | | | | THE RETURN ADDRESS REGISTER CONTENT IS WRITTEN TO PC. THE 98-\ PIPELINE IS FLUSHED. |

Fig._5

| CYCLE | IF | ID | EX | MEM | WB |
|---|---|---|---|---|---|
| 1 | THE POP_WITH_TEST INST. IS BEING FETCHED. ⟵100 | | | | |
| 2 | | THE POP_WITH_TEST HAS ENTERED ID AND THE CORRECT CONTROL SIGNALS ARE GENERATED. ⟵102 | | | |
| 3 | | THE POP_WITH_TEST IS KEPT IN ID AN ADDITIONAL CYCLE. IN THIS CYCLE, THE RETURN VALUE REGISTER IS READ FROM THE REGISTER FILE AND CONTROL SIGNALS TO INSTRUCT THE ALU TO PERFORM THE TEST OPERATION ARE GENERATED. ⟵104 | THE CONTROL SIGNALS TO THE DATA MEMORY ARE ROUTED PAST THE ALU. ⟵106 | | |
| 4 | | | THE ALU SETS THE FLAGS CORRESPONDING TO THE TEST OF THE RETURN VALUE REGISTER. ⟵108 | THE RETURN ADDRESS IS READ FROM DATA MEMORY. ⟵110 | |
| 5 | | | | | THE RETURN ADDRESS READ FROM MEMORY IS WRITTEN TO PC. THE PIPELINE IS FLUSHED. ⟵112 |

Fig._6

METHOD FOR PERFORMING A RETURN OPERATION IN PARALLEL WITH SETTING STATUS FLAGS BASED ON A RETURN VALUE REGISTER TEST

RELATED APPLICATIONS

This application is a continuation of U.S. patent application Ser. No. 11/149,611, filed on Jun. 10, 2005, which is incorporated herein by reference in its entirety.

FIELD

This invention relates to subprogram return operations in microprocessors.

BACKGROUND

Programs frequently feature subroutines which perform a specific task. After the task is performed, program flow returns from the subroutine to the main program. One common mechanism for performing a subroutine return involves conditionally or unconditionally moving the contents of a return address register into a program counter and then continuing program execution. A return value register may also be updated with a constant literal that may represent a Boolean value. Another approach to subprogram returns is to "pop" a return address from the stack and into the program counter and continue program execution from there. This operation may also pop any spooled-out register file contents from the stack into the register file.

Figure 1:
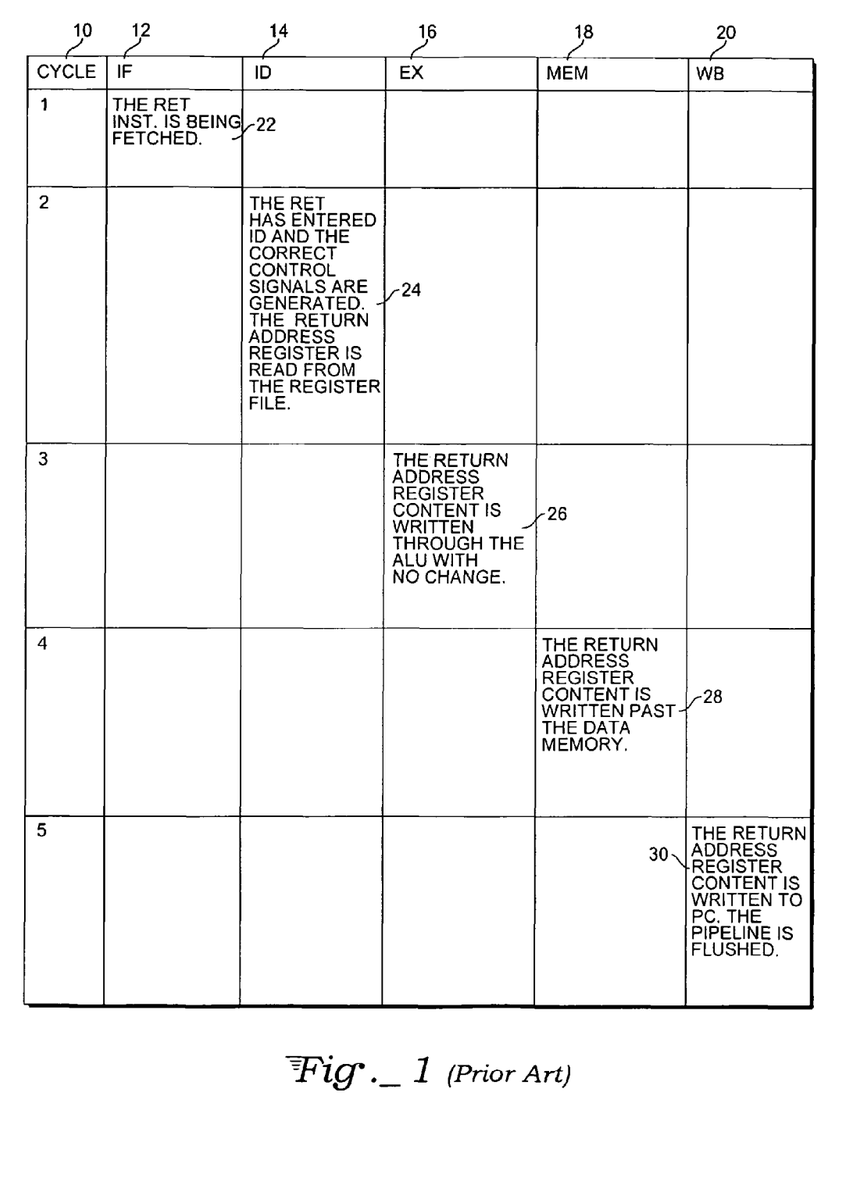
FIG. 1 is a chart showing how a return instruction is executed in the prior art.
Figure 2:
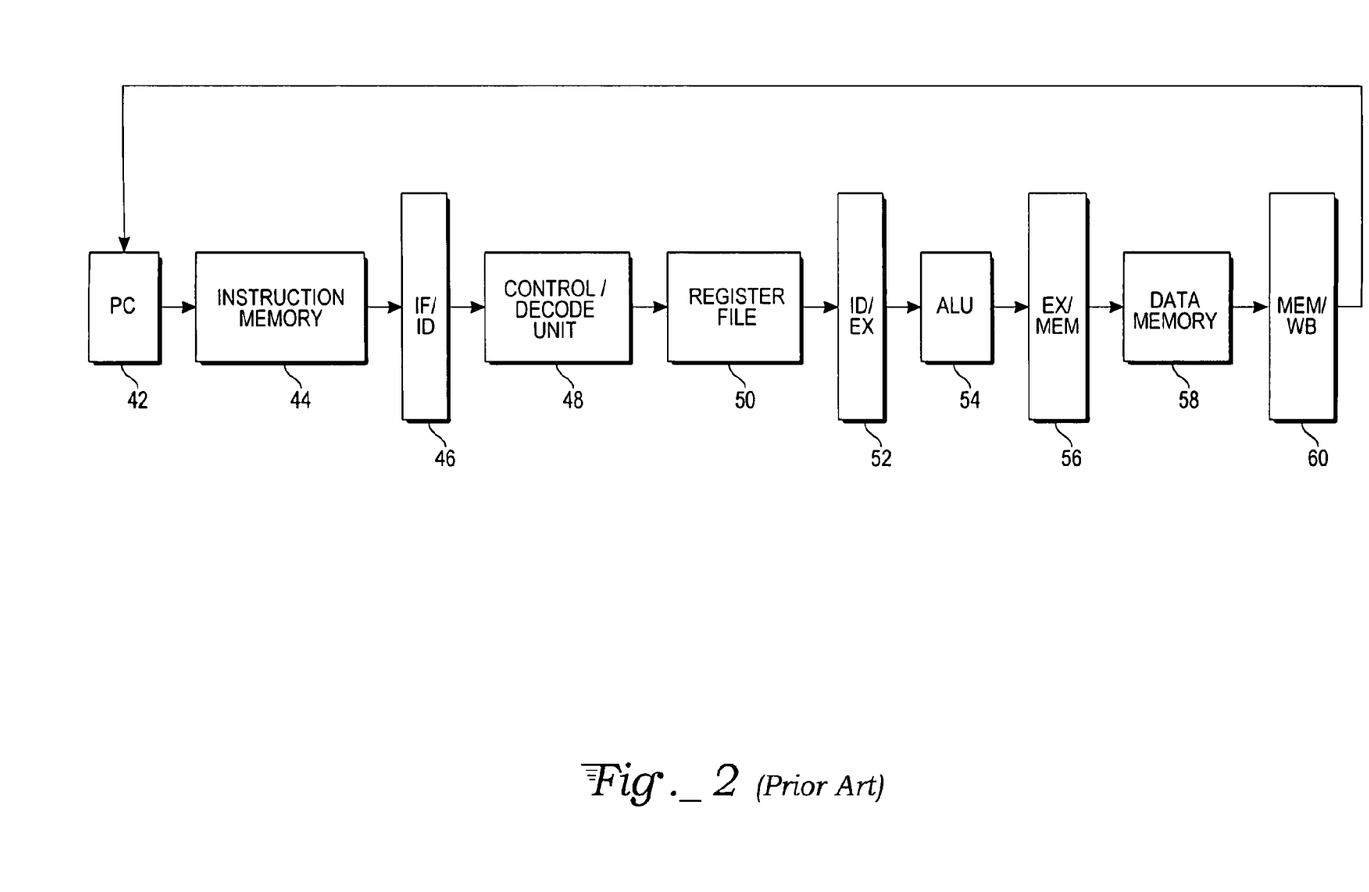
FIG. 2 is a block diagram of a pipelined CPU in the prior art.

These methods for performing subroutine returns take several cycles to execute. In FIG. 1, when a traditional return ("RET") instruction is executed in a typical pipelined CPU, five cycles 10 are required to execute the instruction. In FIG. 2, a typical pipelined CPU contains a Program Counter ("PC") 42 and an instruction memory 44. The CPU has four different pipeline registers 46, 52, 56, and 60 separating the different pipeline stages. The Instruction Decode stage (between registers 46 and 52) contains both a control/decode unit ("CU") 48 for decoding the current instruction and generating control signals and a register file 50. The Execution Stage (between registers 52 and 56) contains an Arithmetic Logic Unit ("ALU") 54. The Memory Stage (between registers 56 and 60) contains a data memory 58.) With continued reference to FIG. 1, during cycle 1, in the Instruction Fetch ("IF") stage 12, the RET instruction is fetched (block 22). In cycle 2, in the Instruction Decode ("ID") stage 14, correct control signals are generated and the return address register is read from the register file (block 24). In cycle 3, in the Execution ("EX") stage 16, the return address register content is written through the Arithmetic Logic Unit ("ALU") with no change (block 26). During cycle 4, in the Memory ("MEM") stage 18, the return address register content is written past the data memory. Finally, in cycle 5, in the Writeback ("WB") 20 stage, the return address register content is written to the Program Counter ("PC") and the pipeline is flushed (block 30). Once the pipeline is flushed, the pipeline does not contain any instructions until the instruction at the return address is read from program memory. Therefore, several clock cycles are wasted in the pipeline flush process.

Figure 3:
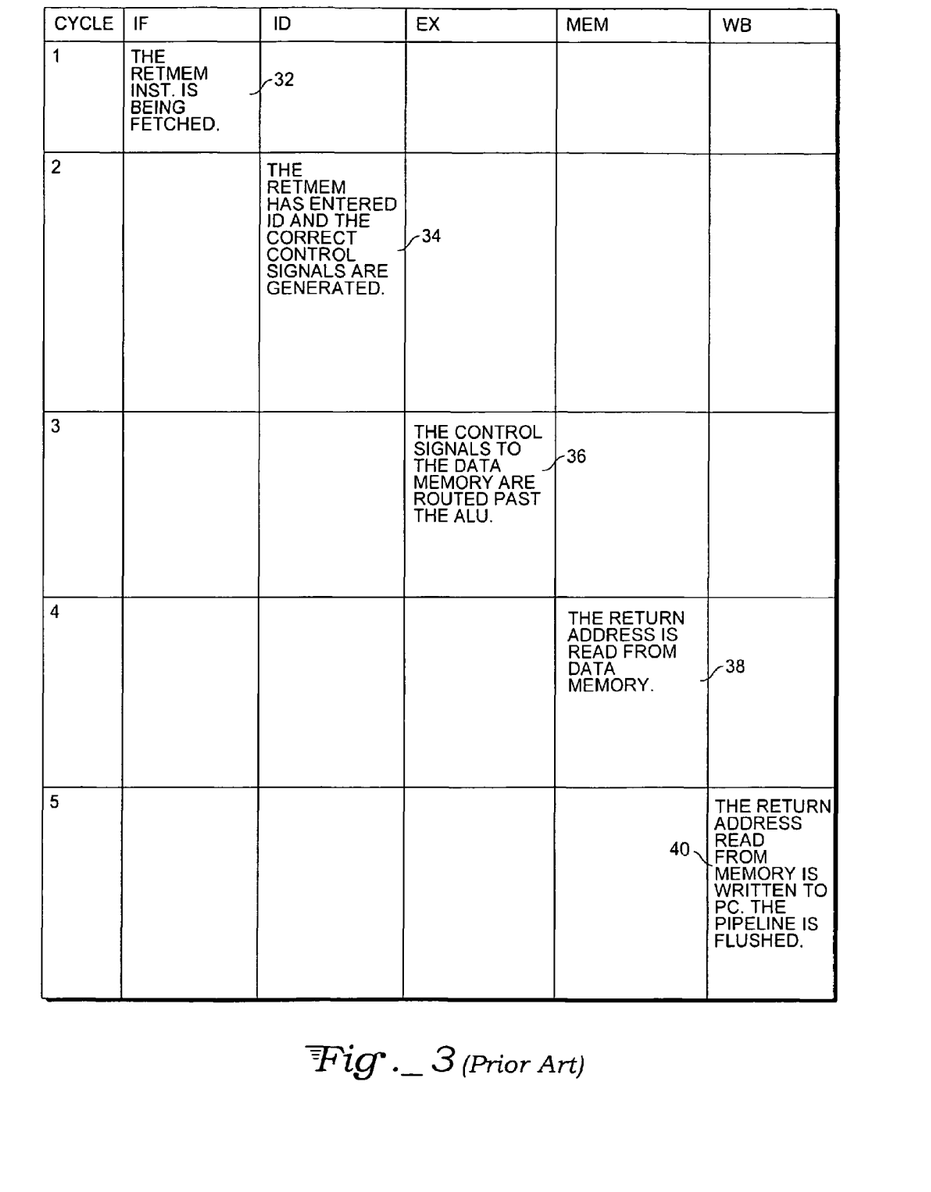
FIG. 3 is a chart showing how a return instruction popping the return address register from a stack in memory is executed in the prior art.

A similar issue exists for a return instruction ("RETMEM") popping the return address register from a stack in memory. As shown in FIG. 3, in cycle 1, in the IF stage, the RETMEM instruction is fetched (block 32). During cycle 2, in the ID stage, the correct control signals are generated. In cycle 3, during the EX stage, the control signals to the data memory are routed past the ALU (block 36). In cycle 4, in the MEM stage, the return address is read from data memory (block 38). Finally, in cycle 5, in the WB stage, the return address read from memory is written to PC and the pipeline is flushed (block 40). As with the return instruction discussed in FIG. 1, several cycles are wasted after the pipeline flush.

It would be advantageous to provide a more efficient subroutine return operation.

SUMMARY

In an exemplary embodiment, an instruction is fetched which requires a return operation and sets status flags based on the contents of a return value register. The status flags are set in parallel with at least one other operation required to process the return instruction. The status flags are set before one of the following occurs: i) contents of a return address register are moved into a program counter; or ii) a return address is popped from a stack and into the program counter. In another embodiment, a processor-readable storage medium causes a processor to perform this subroutine return operation.

In yet another exemplary embodiment of the invention, a subroutine return operation places a return address into a program counter. A test operation is executed on a return value register; the test operation is performed in parallel with at least one other operation required to process the return operation. The program flow is changed to a target address. Each of the above-mentioned steps is performed in response to a single instruction. In one embodiment, a processor-readable storage medium stores an instruction that causes a processor to perform this subroutine return operation.

DETAILED DESCRIPTION

A more efficient subroutine return operation is provided in which status flags are updated (in the processor's status register) according to a test of the return value register during the subroutine return operation. (In the prior art, test operations, for instance, a test of the return value register, are performed in response to a separate instruction.) In one embodiment, the status flags are set in parallel with operations to execute single instructions such as conditional return instructions as well as single instructions incorporating a return operation. The instructions are stored in a processor-readable medium, which includes any medium that can store or transfer information, such as an electronic circuit, a semiconductor memory device, a ROM, a flash memory, a floppy diskette, a compact disc, an optical disc, etc.

Figure 4:
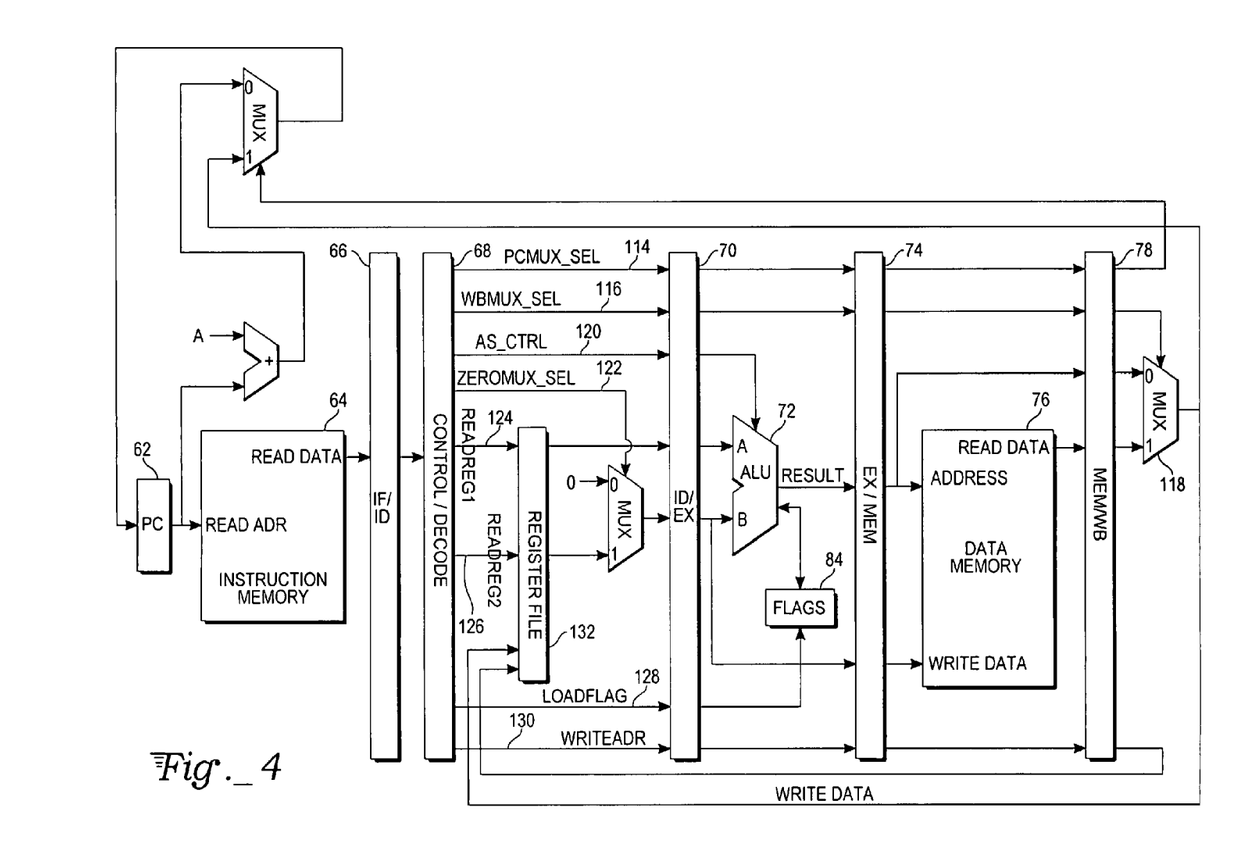
FIG. 4 is a block diagram of a pipelined CPU in an exemplary embodiment of the present invention.

These instructions can be executed by existing hardware. In FIG. 4, an exemplary CPU for executing these instructions includes a PC 62 and instruction memory 64. The CPU contains four pipeline registers (IF/ID 66, ID/EX 70, EX/MEM 74, and MEM/WB 78) separating the different stages. The ID stage, between registers 66 and 70, contains a control/decode unit 68 for decoding the current instruction and generating the correct control signals. The ID stage also contains a register file 132. The EX stage, between registers 70 and 74, contains an ALU 72 and a flag register 84. The MEM stage, between registers 74 and 78, contains data memory 76. When an address has reached the WB stage (after register 78), the pipeline has been flushed and the fetch address is written to PC 62. A multiplexer 118 determines which address is written into the register file or the program counter (this is discussed in greater detail, below). In other embodiments, the processor may have different features, such as data forwarding; as noted above, the CPU described in FIG. 4 is exemplary and is not the only processor which can execute the more efficient subroutine return operation described herein.

In one embodiment of the invention, test operations are performed in parallel with other operations during execution of instructions with the more efficient subroutine return operation. In one embodiment, shown in FIG. 5, when a return ("return_with_test") instruction is executed, during cycle 1 in the IF stage, the return_with_test instruction is fetched (block 86). In cycle 2, the return_with_test has entered the ID stage; the correct control signals are generated and the return address register is read from the register file (block 88). In cycle 3, the return_with_test is kept in the ID stage an additional cycle (in one embodiment, this may be done in the decode stage by splitting the instruction into two "micro-operations": one micro-operation performs the test operation, the other micro-operation performs the return operation); in this second cycle, the return value register is read from the register file and control signals to instruct the ALU to perform the test operation are generated (block 90). In cycle 3 in the EX stage, the return address content is written through the ALU with no change (block 92). During cycle 4 in the EX stage, the ALU sets the flags corresponding to the test of the value register (block 94). (In this embodiment, the status flags are set according to a comparison of the return value register's contents with zero. Status flags used in this embodiment indicate overflow ("V"), a negative value ("N"), a zero result ("Z"), and a carry after an arithmetic or logic operation ("C"). Different status flags may be used in other embodiments and/or status flags may be set differently in other embodiments.) During cycle 4 in the MEM stage, the return address register content is written past the data memory (block 96). During cycle 5, in the WB stage, the return address register content is written to the PC and the pipeline is flushed (block 98). A test operation has been performed using cycles that would otherwise be unused due to the pipeline flush.

Figure 6:
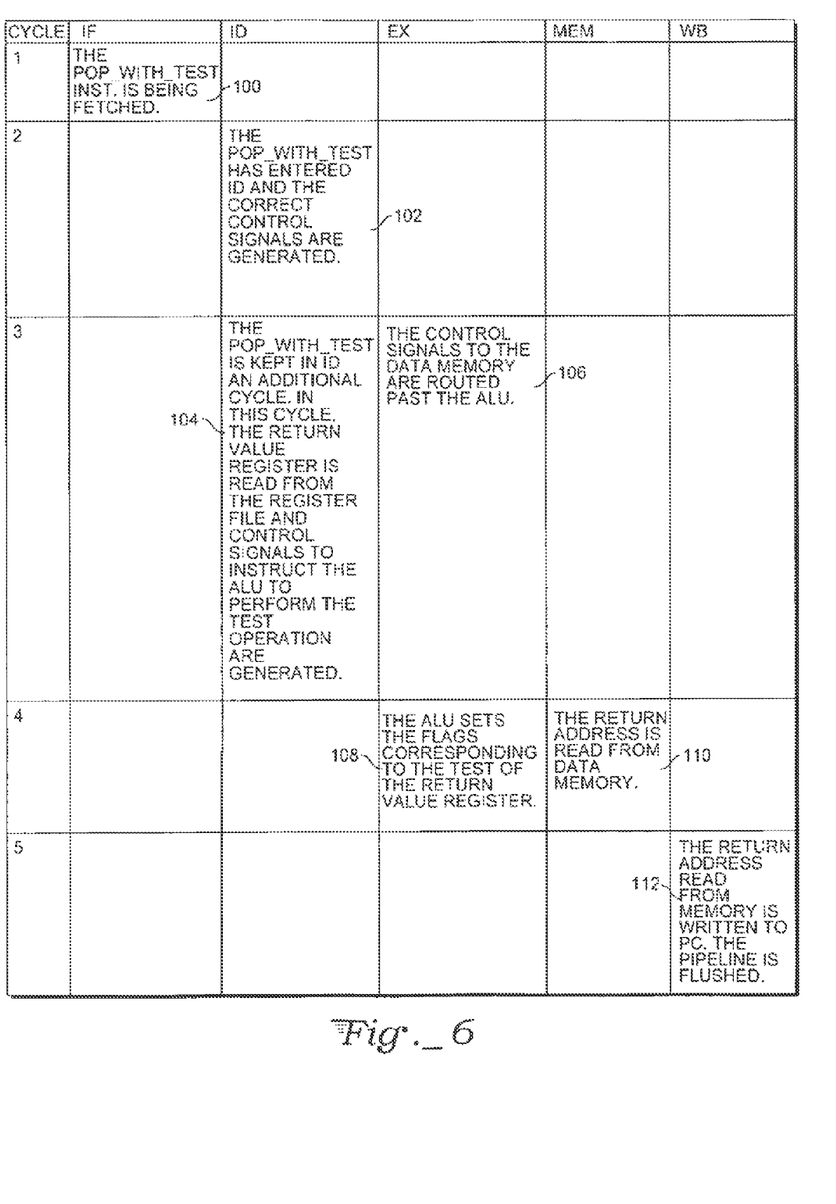
FIG. 6 is a chart showing an exemplary execution of a return instruction popping the return address register from a stack in memory is executed in an embodiment of the present invention.

In another embodiment, a test operation may be performed during execution of a return instruction ("pop_with_test") popping the return address register from a stack in memory. In FIG. 6, in cycle 1 in the IF stage, the pop_with_test instruction is fetched (block 100). During cycle 2, in the ID stage, the correct control signals are generated (block 102). In cycle 3, the pop_with_test is kept in the ID an additional cycle (in one embodiment, the instruction is decoded into two micro-operations (the subroutine return operation and the test operation) in the ID stage); the return value register is read from the register file and control signals to instruct the ALU to perform the test operation are generated (block 104). In cycle 3, in the EX stage, the control signals to data memory are routed past the ALU (block 106). In cycle 4, in the EX stage, the ALU sets the flags corresponding to the test of the return value register (block 108). During the same cycle, in the MEM stage, the return address is read from data memory (block 110). In cycle 5, in the WB stage, the return address read from memory is written to PC and the pipeline is flushed (block 112).

Other embodiments of the invention may vary from the embodiments discussed above. These embodiments may require fewer or additional clock cycles to execute instructions. Other embodiments may require different hardware to execute the instructions. Still other embodiments may be incorporated into different subprogram return operations and instructions.

Figure 5:
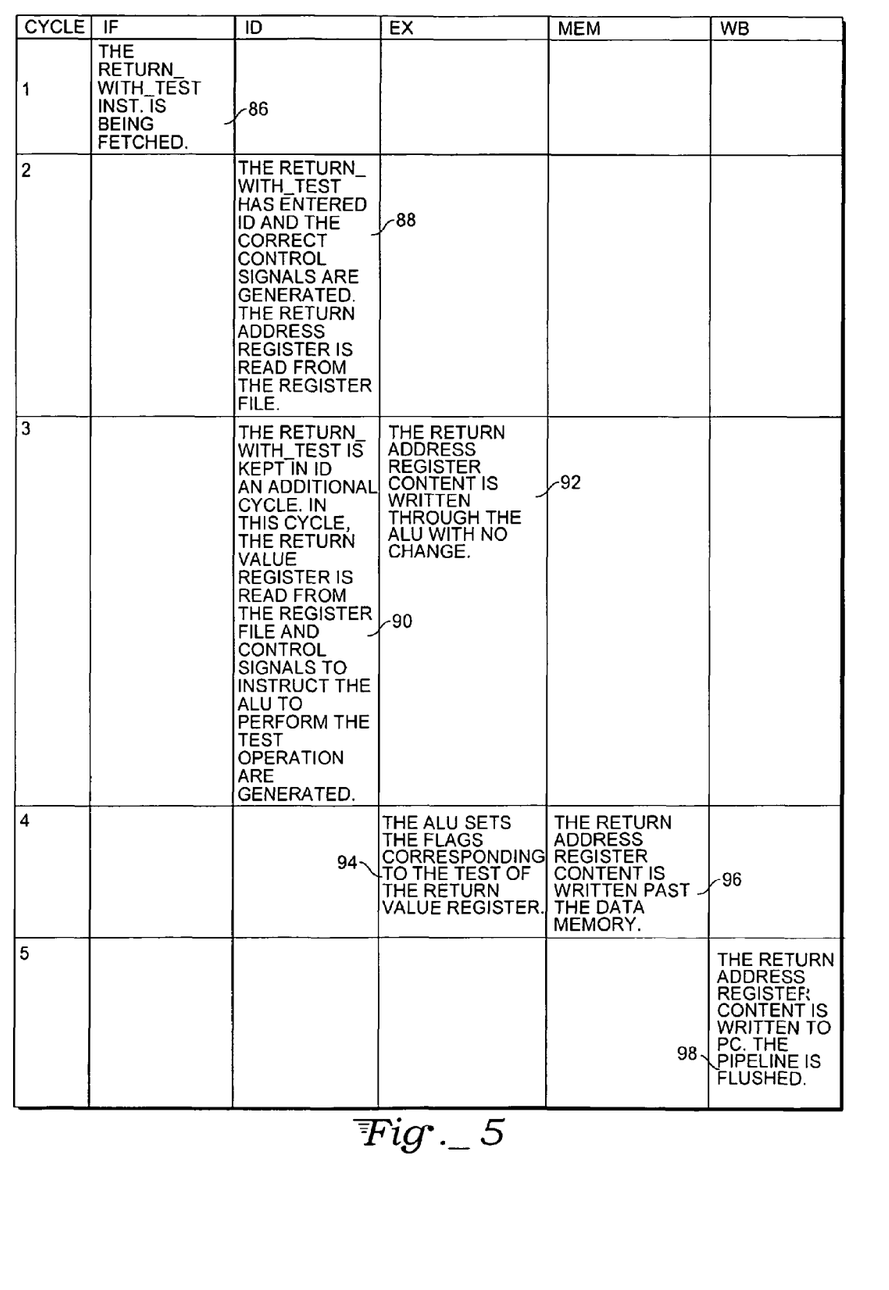
FIG. 5 is a chart showing an exemplary execution of a return instruction in an embodiment of the present invention.

FIGS. 5 and 6 are exemplary embodiments of "return_with_test" and "pop_with_test" instructions, respectively. In the "return_with_test" instruction, a "return" is performed together with testing the value in the return value register. The "test" tests the specified register and sets the condition code flags accordingly. The "pop_with_test" instruction performs a "pop" (loading a word from the stack into a specified register or a program counter; popping to PC flushes the pipeline and starts fetching instructions from the address loaded from the stack) together with testing the value in the return value register.

Various signals are required from the control/decode unit. Returning to FIG. 4, the following signals required in one embodiment are:

pcmux_sel 114—Selector signal used to choose if the program counter is going to be updated with the sequential program address or the address given by the return instruction.

wbmux_sel 116—Selector signal used by the writeback stage to determine which address is to be written into the register file or into the program counter. If signal is logic "0," the address comes from the ALU result from the EX/MEM pipeline stage. If the signal is logic "1," the address comes from the data memory.

as_ctrl 120—Control signal used to choose if the adder in the ALU will perform subtraction or addition on the operands from the register file.

zeromux_sel 122—Signal used to force input operand B to the ALU to integer value zero.

readreg1 124—Register file register number for operand 1.
readreg2 126—Register file register for operand 2.
loadflag 128—Control signal to allow the status register to update the flag settings.
writeaddr130—Register file register number for the register where the result is written back.

The following table lists exemplary outputs from the control/decode unit in the cycles of the RET instruction. The registers identified in the table are:

R12—the Return Value Register. Test operations are performed on this register.

LR—the Link Register. Keeps the address to return to after the subprogram has completed. LR may also be referred to as the Return Address Register (RAR)

PC—the Program Counter. Holds the address of the currently executing instruction.

The following table lists exemplary outputs from the control/decode unit in the cycles of the return_with_test instruction.

| Cycle | Control signal output | Textual instruction |
|---|---|---|
| 1 | pcmux_sel = 1<br>wbmux_sel = 0<br>as_ctrl = add | Write the contents of LR into the PC register so that instruction fetch will |

-continued

| Cycle | Control signal output | Textual instruction |
|---|---|---|
| | zeromux_sel = 0<br>readreg1 = X (don't care value)<br>readreg2 = LR<br>loadflag = 0<br>writeadr = X (don't care value) | restart from this address. |
| 2 | pcmux_sel = 0<br>wbmux_sel = X (don't care value)<br>as_ctrl = sub<br>zeromux_sel = 0<br>readreg1 = X (don't care value)<br>readreg2 = Return Value Register<br>loadflag = 1<br>writeadr = X (don't care value) | Test the contents of the Return Value Register by comparing it with the value 0. Write the resulting flags into the Flag Register. |

The following table lists exemplary outputs from the control/decode unit in the cycles of the pop_with_test instruction.

| Cycle | Control signal output | Textual instruction |
|---|---|---|
| 1 | pcmux_sel = 1<br>wbmux_sel = 1<br>as_ctrl = add<br>zeromux_sel = 0<br>readreg1 = X (don't care value)<br>readreg2 = Pointer Register<br>loadflag = 0<br>writeadr = X (don't care value) | Write the contents of the return address read from memory into the PC register so that instruction fetch will restart from this address. The return address resides in a memory address pointed to by the pointer register. |
| 2 | pcmux_sel = 0<br>wbmux_sel = X (don't care value)<br>as_ctrl = sub<br>zeromux_sel = 0<br>readreg1 = X (don't care value)<br>readreg2 = Return Value Register<br>loadflag = 1<br>writeadr = X (don't care value) | Test the contents of the Return Value Register by comparing it with the value 0. Write the resulting flags into the Flag Register. |

The "return_with_test" and "pop_with_test" instructions can be executed as part of other instructions. For instance, the "return_with_test" instruction can be executed as part of a conditional return instruction, in which there is a return from the subroutine if a specified condition is true. Values are moved into the return register, the return value is tested, and flags are set. A specific example of this instruction is the "ret{cond4}" instruction in the ATMEL AVR32 instruction set. The following pseudocode describes the ret{cond4} instruction (SP is the stack pointer register):

```
Operation:
  I. If (cond4)
       If (Rs != {LR, SP, PC})
          R12 ← Rs;
       else if (Rs == LR)
          R12 ← -1;
       else if (Rs == SP)
          R12 ← 0;
       else
          R12 ← 1;
       Test R12 and set flags;
       PC ← LR;
```

Syntax:
I. ret{cond4} Rs
Operands:
I. cond4 ∈ {eq, ne, cc/hs, cs/lo, ge, lt, mi, pl, ls, gt, le, hi, vs, vc, qs, al}
s ∈ {0, 1, ... , 15}
Status Flags:
Flags are set as result of the operation CP R12, 0.
V: V ← 0
N: N ← RES[31]
Z: Z ← (RES[31:0] == 0)
C: C ← 0

The following table explains some of the mnemonics used above and the pseudocode for the "Load Multiple Registers" instruction, below:

| Mnemonic | Meaning |
|---|---|
| eq | Equal |
| ne | Not equal |
| cc/hs | Higher or same |
| cs/lo | Lower |
| ge | Greater than or equal |
| lt | Less than |
| mi | Minus/negative |
| pl | Plus/positive |
| ls | Lower or same |
| gt | Greater than |
| le | Less than or equal |
| hi | Higher |
| vs | Overflow |
| vc | No overflow |
| qs | Saturation |
| al | Always |

The operation CP R12, 0 is a comparison or subtraction operation without operation. In this particular case, the result of the operation32 R12−0.

Another instruction in which the "return_with_test" operation may be employed is the "Load Multiple Registers" instruction from the AVR32 instruction set. This instruction loads consecutive words pointed to by the register pointer into the register specified in the instruction. The PC can be loaded, resulting in a jump to the loaded target address. If the PC is loaded, the return value in R12 is tested and the flags are updated. The return value optionally may be set to −1, 0, or 1. The following pseudocode describes this instruction (SP is a stack pointer):

```
I.  Loadaddress ← Rp;
    if Reglist16[PC] == 1 then
       if Rp == PC then
          Loadaddress ← SP;
       PC ← * (Loadaddress++);
       if Rp == PC then
          if Reglist16[LR,R12] == B'00
             R12 ← 0;
          else if Reglist16[LR,R12] == B'01
             R12 ← 1;
          else
             R12 ← -1;
          Test R12 and update flags;
       else
          Test R12 and update flags;
       if Reglist16[LR] == 1
          LR ← *(Loadaddress++);
       if Reglist16[SP] == 1
          SP ← *(Loadaddress++);
       if Reglist16[R12] == 1
```

-continued

```
            R12 ← *(Loadaddress++);
    else
        if Reglist16[LR] == 1
            LR ← *(Loadaddress++);
        if Reglist16[SP] == 1
            SP ← *(Loadaddress++);
        if Reglist16[R12] == 1
            R12 ← *(Loadaddress++);
    for (i = 11 to 0)
        if Reglist16[i] == 1 then
            Ri ← *(Loadaddress++);
    if Opcode[++] == 1 then
        if Rp == PC then
            SP ← Loadaddress;
        else
            Rp Loadaddress;
Syntax:
I. ldm Rp{++}, Reglist16
Operands:
I. Reglist16 ∈ {R0, R1, R2, ... , R12, LR, SP, PC}
p ∈ {0, 1, ... , 15}
Status Flags:
Flags are only updated if Reglist16[PC] == 1.
They are set as the result of the operation CP R12, 0.
V: V ← 0
N: N ← RES [31]
Z: Z ← (RES[31:0] == 0)
C: C ← 0
```

Similar instructions employing the "pop_with_test" operation may be employed in which words pointed to by SP are loaded into registers specified in the instruction.

An instruction in which the "pop_with_test" operation may be employed is the Pop Multiple Registers from Stack ("POPM") instruction from the AVR32 instruction set. This instruction loads the consecutive words pointed to by SP into the registers specified in the instruction.

While specific examples have been cited above showing how the subroutine return operation may be employed in different instructions, other embodiments may incorporate the subroutine operation into different instructions.

One advantage of the more efficient subroutine return operations is the reduction in code size, since an explicit "test return register" instruction can be eliminated since the test operation may be performed implicitly by the return operation. Another advantage is that execution time is reduced since the return register test is performed in parallel with the fetching of the instruction to which the program will return.

The instructions and operations described above may be employed in both RISC and CISC machines.

Although the present invention has been described in terms of specific exemplary embodiments, one skilled in the art will recognize variations and additions to the embodiments may be made without departing from the principles of the present invention. For instance, return operations may require more or fewer cycles to be executed, or the return operations may be part of different instructions, or the processors executing the return operations may have different architectures. In another embodiment, more hardware may be added so the return operations could be completed in one cycle (i.e., the two micro-operations performed in response to a single instruction are completed in one cycle).

What is claimed is:

1. A method comprising:
   receiving a single instruction that includes a return operation;
   dividing the single instruction into a first micro-operation and a second micro-operation in an instruction decode stage, wherein the first micro-operation is configured for performing the return operation and the second micro-operation is configured for performing a test operation;
   reading, using the first micro-operation, information associated with a return address from a register file in the instruction decode stage;
   providing, using the first micro-operation, the information associated with the return address to an arithmetic logic unit in an execution stage;
   reading, using the second micro-operation in the instruction decode stage in parallel with the first micro-operation in the execution stage, a content of a return value register;
   responsive to the reading using the second micro-operation in the instruction decode stage, testing the content of the return value register using the second micro-operation in the execution stage;
   setting, using the second micro-operation in the execution stage, status flags that includes writing a value into a flag register based on testing the content of the return value register; and
   providing, while the first micro-operation is in a memory stage in parallel with the second micro-operation in the execution stage, the information associated with the return address to a pipeline register connected to a multiplexer included in a writeback stage, the multiplexer configured for sending the information associated with the return address to a program counter via an output of the multiplexer.

2. The method of claim 1, wherein the status flags are set according to a comparison of the content of the return value register with zero.

3. The method of claim 1, wherein the single instruction is kept in the instruction decode stage for an additional cycle after the single instruction is fetched.

4. The method of claim 1, wherein the status flags are set before the information associated with the return address is written to the program counter, the information including a content of a return address register.

5. The method of claim 1, wherein testing the content of the return value register is performed without receiving a test instruction.

6. The method of claim 1, further comprising:
   loading consecutive words pointed to by a register pointer into a register specified by the single instruction, wherein the content of the return value register is tested and the status flags are updated if a program counter is loaded.

7. A processing unit comprising:
   a program counter, wherein the processing unit is configured to execute a single instruction that includes a return operation and is divided into a first micro-operation and a second micro-operation in an instruction decode stage, wherein:
      the first micro-operation is configured to return information associated with a return address and provide, based on execution of the first micro-operation in a memory stage, the information to a multiplexer included in a writeback stage; and
      the second micro-operation is configured to test, in an execution stage in parallel with the first micro-operation in the memory stage, a content of a return value register and set status flags including writing a value into a flag register based on testing the content of the return value register; and
   the multiplexer configured to send the information associated with the return address to a program counter via an output of the multiplexer.

8. The processing unit of claim 7, wherein the first micro-operation is configured to route a first control signal associated with the return address past an arithmetic logic unit of the processing unit before setting of the status flags.

9. The processing unit of claim 8, further comprising a second multiplexer, the second multiplexer including a first input coupled to the output of the multiplexer included in the writeback stage to receive the information associated with the return address, a node to receive a second control signal, and an output to enable writing the information associated with the return address to the program counter when the second control signal has a first value.

10. The processing unit of claim 9, wherein the second multiplexer further includes a second input to receive a sequential program address, and wherein the second multiplexer is further configured to enable updating of the program counter with the sequential program address when the second control signal has a second value.

11. The processing unit of claim 8, wherein the information associated with the return address includes a return address read from data memory, and wherein the processing unit further comprises a second multiplexer, the second multiplexer including a first input coupled to the output of the multiplexer included in the writeback stage to receive the return address read from the data memory, a node to receive a second control signal, and an output to enable writing the return address read from the data memory to the program counter when the second control signal has a first value.

12. The processing unit of claim 11, wherein the second multiplexer further includes a second input to receive a sequential program address, and wherein the second multiplexer is further configured to enable updating of the program counter with the sequential program address when the second control signal has a second value.

13. The processing unit of claim 7, wherein the second micro-operation is configured to test the content of the return value register in order to determine whether return conditions are satisfied.

14. A non-transitory processor-readable storage medium storing instructions that, when executed by a processor, cause the processor to perform operations including:
  receiving a single instruction that includes a return operation;
  dividing the single instruction into a first micro-operation and a second micro-operation in an instruction decode stage, wherein the first micro-operation is configured for performing the return operation and the second micro-operation is configured for performing a test operation;
  reading, using the first micro-operation, information associated with a return address from a register file in the instruction decode stage;
  providing, using the first micro-operation, the information associated with the return address to an arithmetic logic unit in an execution stage;
  reading, using the second micro-operation in the instruction decode stage in parallel with the first micro-operation in the execution stage, a content of a return value register;
  responsive to the reading using the second micro-operation in the instruction decode stage, testing the content of the return value register using the second micro-operation in the execution stage;
  setting, using the second micro-operation in the execution stage, status flags that includes writing a value into a flag register based on testing the content of the return value register; and
  providing, while the first micro-operation is in a memory stage in parallel with the second micro-operation in the execution stage, the information associated with the return address to a pipeline register connected to a multiplexer included in a writeback stage, the multiplexer configured for sending the information associated with the return address to a program counter via an output of the multiplexer.

15. The non-transitory processor-readable storage medium of claim 14, wherein the instructions further cause the processor to perform operations including:
  writing a content of a return address register to the program counter in response to a first value of a first control signal; and
  writing a return address read from data memory to the program counter in response to a second value of the first control signal.

16. The non-transitory processor-readable storage medium of claim 15, wherein the instructions further cause the processor to perform operations including updating the program counter with a sequential program address in response to a second control signal, and wherein writing the content of the return address register to the program counter and writing the return address read from data memory are performed when the second control signal has a first value, and updating the program counter with the sequential program address is performed when the second control signal has a second value, regardless of a value of the first control signal.

* * * * *